US011197551B2

(12) United States Patent
Brooks

(10) Patent No.: US 11,197,551 B2
(45) Date of Patent: Dec. 14, 2021

(54) SEAT TRANSIT SYSTEMS AND METHODS

(71) Applicant: The Boeing Company, Chicago, IL (US)

(72) Inventor: Jody Brooks, Seattle, WA (US)

(73) Assignee: The Boeing Company, Chicago, IL (US)

(*) Notice: Subject to any disclaimer, the term of this patent is extended or adjusted under 35 U.S.C. 154(b) by 18 days.

(21) Appl. No.: 16/677,878

(22) Filed: Nov. 8, 2019

(65) Prior Publication Data

US 2021/0137272 A1 May 13, 2021

(51) Int. Cl.
*A47C 7/00* (2006.01)
*B64D 11/06* (2006.01)
*B64F 5/50* (2017.01)
B62B 1/00 (2006.01)
B62B 3/00 (2006.01)

(52) U.S. Cl.
CPC .......... *A47C 7/002* (2013.01); *B64D 11/0648* (2014.12); *B64D 11/0696* (2013.01); *B64F 5/50* (2017.01); *B62B 1/002* (2013.01); *B62B 3/00* (2013.01); *B62B 2202/34* (2013.01)

(58) Field of Classification Search
None
See application file for complete search history.

(56) References Cited

U.S. PATENT DOCUMENTS

| 1,604,723 | A | * | 10/1926 | Rutherford | ........... B62B 5/0086 280/47.131 |
| 2,556,947 | A | * | 6/1951 | Smith | ....................... B62B 3/10 280/35 |
| 3,884,493 | A | * | 5/1975 | Weir | ..................... D06F 39/125 280/79.11 |
| 4,014,560 | A | * | 3/1977 | Hughes | ..................... B60P 3/40 280/47.131 |
| 4,122,958 | A | * | 10/1978 | Thayer | ..................... B62B 3/10 254/3 R |
| 4,220,347 | A | * | 9/1980 | Huntington | ............. B60B 33/00 280/79.11 |
| 4,913,614 | A | * | 4/1990 | O'Rarden | ................. B62B 3/10 187/244 |
| 5,044,645 | A | * | 9/1991 | Eltvik | ................... B60B 29/002 280/79.4 |
| 5,048,902 | A | * | 9/1991 | Daly | ....................... B62B 3/006 312/249.8 |
| 5,476,282 | A | * | 12/1995 | Dahl | ....................... B62B 1/002 280/47.18 |
| 5,486,014 | A | * | 1/1996 | Hough | .................. B62B 5/0083 24/535 |

(Continued)

FOREIGN PATENT DOCUMENTS

| GB | 1187524 | A | * | 4/1970 | .......... B62B 5/0083 |
| JP | 2013043600 | A | * | 3/2013 | |
| JP | 2020074998 | A | * | 5/2020 | |

*Primary Examiner* — David E Allred
(74) *Attorney, Agent, or Firm* — The Small Patent Law Group LLC; Joseph M. Butscher

(57) ABSTRACT

A seat skate assembly is configured to be secured to a fitting of a seat assembly. The seat skate assembly includes a pin-retaining guide including a plurality of pin cavities configured to receive and retain one or more pins of the fitting, one or more wheel couplers, and one or more wheel members rotatably coupled to the wheel coupler(s). The wheel member(s) allow the seat assembly to be moved.

20 Claims, 12 Drawing Sheets

(56) References Cited

U.S. PATENT DOCUMENTS

| | | | | |
|---|---|---|---|---|
| 5,897,122 | A * | 4/1999 | Borner | B25H 5/00 280/32.6 |
| 5,897,462 | A * | 4/1999 | St. Germain | A61G 5/00 482/66 |
| 5,938,217 | A * | 8/1999 | Wintz | B62B 5/0083 280/79.11 |
| 6,109,625 | A * | 8/2000 | Hewitt | B60B 33/0007 280/43.24 |
| 6,394,470 | B1 * | 5/2002 | Shirai | B62B 3/184 280/33.996 |
| 6,702,065 | B2 * | 3/2004 | Ehnes | B25H 5/00 182/127 |
| 6,857,644 | B2 * | 2/2005 | Hsiao | B25H 3/02 280/32.5 |
| 6,929,268 | B1 * | 8/2005 | Owens | B62B 3/008 190/18 A |
| 7,140,622 | B1 * | 11/2006 | Cantu | B62B 3/001 280/79.11 |
| 7,232,138 | B2 * | 6/2007 | Shubert | B60P 3/125 280/47.34 |
| 7,270,339 | B2 * | 9/2007 | Feick | A47F 5/137 211/186 |
| 7,597,392 | B1 * | 10/2009 | Gilmore | A47C 7/62 297/217.1 |
| 8,348,287 | B1 * | 1/2013 | Smith | B62B 3/108 280/79.7 |
| 8,596,651 | B2 * | 12/2013 | Canova | A47C 3/36 280/32.5 |
| 8,678,403 | B1 * | 3/2014 | McCleave | G10H 1/32 280/35 |
| 8,844,947 | B1 * | 9/2014 | Whiteside | B25H 5/00 280/32.6 |
| 9,097,384 | B1 * | 8/2015 | Simon | F16M 11/20 |
| D750,391 | S * | 3/2016 | Lensing | D6/349 |
| 9,481,387 | B2 * | 11/2016 | Della Polla | B62B 3/02 |
| 9,688,420 | B2 * | 6/2017 | Rollfink | B64F 5/10 |
| 9,963,159 | B1 * | 5/2018 | Garcia | B62B 5/0086 |
| 9,969,416 | B2 * | 5/2018 | Tarrant | B62B 5/0086 |
| 10,016,062 | B2 * | 7/2018 | Reynolds | A47C 7/029 |
| 10,286,943 | B1 * | 5/2019 | Greenblatt | B62B 3/104 |
| 10,850,920 | B1 * | 12/2020 | Allen | B65F 1/1473 |
| 10,939,787 | B2 * | 3/2021 | Singh | A47L 9/122 |
| 2003/0205875 | A1 * | 11/2003 | Ondrasik | B62B 3/1476 280/47.34 |
| 2005/0047901 | A1 * | 3/2005 | Eggleston | B62B 5/0093 414/800 |
| 2006/0091096 | A1 * | 5/2006 | Velez | B62B 3/10 211/194 |
| 2007/0193904 | A1 * | 8/2007 | Cromie | B64F 5/50 206/386 |
| 2008/0056871 | A1 * | 3/2008 | Morgan | B62B 5/049 414/495 |
| 2010/0187783 | A1 * | 7/2010 | Rosen | B66F 11/048 280/47.11 |
| 2010/0219143 | A1 * | 9/2010 | McCleave | G10H 1/32 211/85.8 |
| 2011/0297905 | A1 * | 12/2011 | Arensdorf | B66F 3/08 254/8 R |
| 2012/0216347 | A1 * | 8/2012 | Tundo | F16H 21/40 5/109 |
| 2012/0286486 | A1 * | 11/2012 | Varney | B62B 5/0093 280/47.11 |
| 2013/0187352 | A1 * | 7/2013 | Hassell | B62B 5/0093 280/79.11 |
| 2014/0145131 | A1 * | 5/2014 | Cozza | B62B 1/26 254/7 R |
| 2015/0217791 | A1 * | 8/2015 | Leijdekkers | B62B 5/0485 280/79.11 |
| 2015/0351553 | A1 * | 12/2015 | Herring | A47B 97/00 482/54 |
| 2015/0367874 | A1 * | 12/2015 | Anderson | B62B 5/00 414/814 |
| 2017/0282778 | A1 * | 10/2017 | Young, Jr. | B62B 5/0083 |
| 2018/0037058 | A1 * | 2/2018 | Saito | B60B 33/0026 |
| 2018/0362308 | A1 * | 12/2018 | Chamoun | B60S 13/00 |
| 2020/0055534 | A1 * | 2/2020 | Hassell | B62B 3/006 |
| 2020/0369306 | A1 * | 11/2020 | West, Jr. | B62B 1/12 |
| 2020/0385042 | A1 * | 12/2020 | Verwys | B62B 3/02 |
| 2020/0406946 | A1 * | 12/2020 | Cozza | B62B 5/0093 |
| 2021/0009023 | A1 * | 1/2021 | Hoeper | B60P 1/52 |

\* cited by examiner

SEAT TRANSIT SYSTEMS AND METHODS

FIELD OF EMBODIMENTS OF THE DISCLOSURE

Embodiments of the present disclosure generally relate to seat transit systems and methods, and more particularly, to systems and methods for transporting a seat assembly to an internal cabin of a vehicle, such as a commercial aircraft.

BACKGROUND OF THE DISCLOSURE

Commercial aircraft typically include an internal cabin that may be divided into numerous sections. A cockpit is generally separated from a passenger cabin, which may include a first class section, a business class section, an economy section, and the like.

As a commercial aircraft is being manufactured, passenger seats are secured within an internal cabin. In general, seat assemblies are formed by a supplier and transported to a location of the aircraft that being manufacture, where they are installed within the internal cabin.

A seat assembly includes fittings having pins that are configured to be secured within a seat track located within an internal cabin. As the seat assembly is transported to the location of the aircraft that is being manufactured, the pins are protected. For example, before a seat assembly is loaded into a shipping box, protective covers are positioned on the fittings to protect the pins.

After the shipping box is delivered to the location of the aircraft, the seat assembly is removed from the shipping box. An installation crew then removes the protective covers (such as via tools) from the fittings and inspects the pins to determine whether the pins have been damaged. Then, the installation crew uses tools to install specialized conveyances onto the seat assemblies. In particular, a track segment is positioned underneath the fittings, and specialized mounts and rollers are secured underneath the track segment. The pins of the fittings are secured within the track segment, and then the mounts and rollers are secured to the track segment, such as via tools. Once the track segments, mounts, and rollers are secured to each fitting of a seat assembly, the seat assembly is then maneuvered onto a seat lift, which is then used to move the seat assembly into an internal cabin.

The specialized track segments, mounts, and rollers are typically discarded after the seat assembly is maneuvered into the internal cabin. In particular, the track segments, mounts, and rollers are removed from the seat assembly in order to secure the seat assembly to seat tracks within the internal cabin.

As can be appreciated, the process of removing the protective covers from fittings, securing specialized conveyances to the fittings, and ultimately removing the conveyances from the fittings in order to secure the seat assembly to seat tracks within an internal cabin is time and labor intensive. Moreover, the specialized conveyances are costly.

SUMMARY OF THE DISCLOSURE

A need exists for an efficient system and method for transporting a seat assembly to an internal cabin of a vehicle that is being manufactured. Further, a need exists for an efficient system and method for protecting fittings of seat assemblies during transport. Moreover, a need exists for a system and method for simplifying an installation process for seat assemblies in relation to an internal cabin of a vehicle.

With those needs in mind, certain embodiments of the present disclosure provide a seat skate assembly configured to be secured to a fitting of a seat assembly. The seat skate assembly includes a pin-retaining guide including a plurality of pin cavities configured to receive and retain one or more pins of the fitting, one or more wheel couplers, and one or more wheel members rotatably coupled to the wheel coupler(s). The wheel member(s) allow the seat assembly to be moved.

The pin-retaining guide further may also include a recessed channel extending between a first end and a second end. The pin-retaining guide may also include lateral ridges on sides of the recessed channel.

In at least one embodiment, the pin-retaining guide further includes a plurality of tie channels configured to receive and retain ties that securely tie the fitting to the seat skate assembly.

In at least one embodiment, the wheel coupler(s) include an upper prong, and a lower prong spaced apart from the upper prong. A portion of the wheel member(s) is rotatably secured between the upper prong and the lower prong. As an example, the wheel member may include two wheels connected by a wheel axle.

In at least one embodiment, the seat skate assembly is symmetrical about a longitudinal axis. In at least one embodiment, the seat skate assembly may also be symmetrical about a lateral axis. In at least one embodiment, the pin-retaining guide is symmetrical about a vertical axis and a horizontal axis.

The pin-retaining guide may include one or more locating indications that indicate one or more pin positions for the fitting.

The seat skate assembly may include one or more bushings having internal pin cavities having a smaller diameter than the plurality of pin cavities. The bushing(s) are configured to be inserted into one or more of the plurality of pin cavities.

In at least one embodiment, at least one of the plurality of pin cavities has a first diameter and a second diameter that differs from the first diameter.

Certain embodiments of the present disclosure provide a seat assembly including a first aft leg, a first fitting coupled to the first aft leg, a second aft leg, a second fitting coupled to the second aft leg, a first fore leg, a third fitting coupled to the first fore leg, a second fore leg, a fourth fitting coupled to the second fore leg, and a plurality of seat skate assemblies, as described herein. Each of the plurality of seat skate assemblies is secured to a respective one of the first fitting, the second fitting, the third fitting, or the fourth fitting. In at least one embodiment, a first lower bar connects the first aft leg to the first fore leg, and a second lower bar connects the second aft leg to the second fore leg. In at least one embodiment, the plurality of seat skate assemblies are directly secured to the seat assembly before the seat assembly is positioned within a shipping box.

Certain embodiments of the present disclosure provide a method of transporting a seat assembly. The method includes securing a seat skate assembly to a fitting of the seat assembly. Said securing includes retaining a plurality of pins of the fittings within pin cavities of the seat skate assembly. The method also includes moving the seat assembly with one or more wheel members rotatably coupled to one or more wheel couplers of the seat skate assembly. In at least one embodiment, the method includes positioning the seat assembly within in a shipping box. Said securing occurs before said positioning.

DETAILED DESCRIPTION OF THE DISCLOSURE

Figure 1:
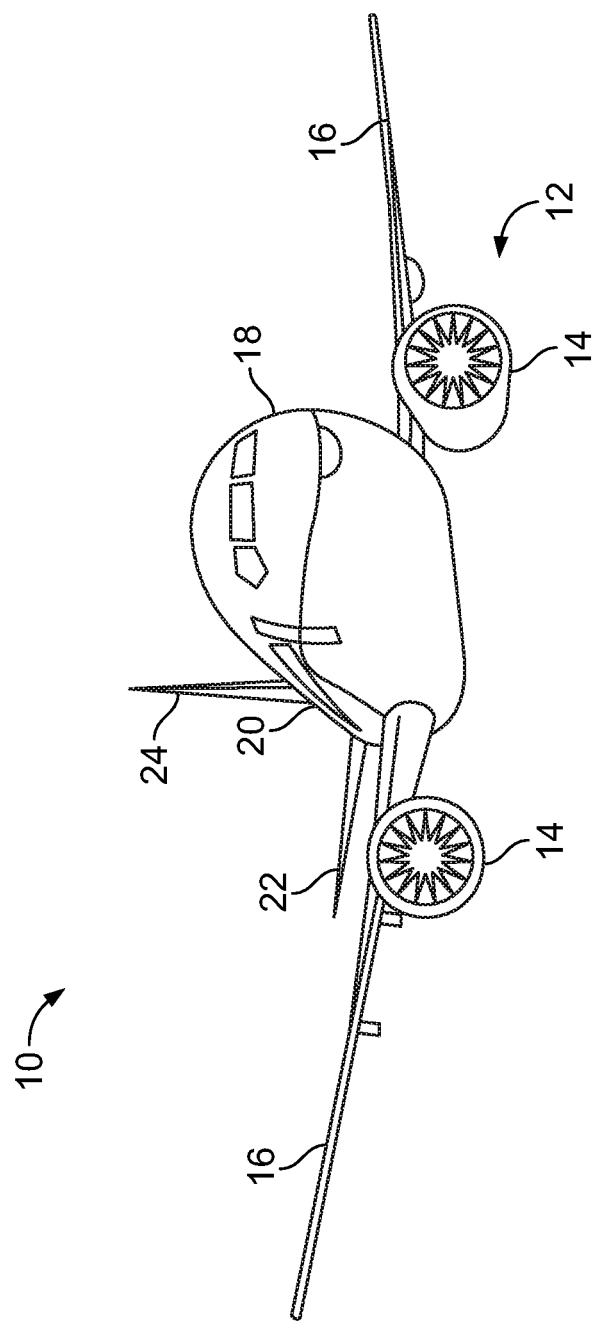
FIG. 1 illustrates a perspective front view of an aircraft, according to an embodiment of the present disclosure.

The foregoing summary, as well as the following detailed description of certain embodiments, will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

Certain embodiments of the present disclosure provide a seat transport system and method that includes a seat skate assembly that is configured to be secured to a fitting of a seat assembly. The seat skate assembly protects the fitting, including pins, during transport of the seat assembly to an installation location, where the seat assembly is installed into a vehicle, such as a commercial aircraft. The seat skate assembly includes a main body including a pin-retaining guide that includes a plurality of pin cavities that are configured to receive and retain one or more pins of a fitting of a seat assembly. The main body also includes one or more wheel couplers that rotatably retain one or more wheels. The wheel(s) allow the seat assembly to be rolled to a location. A manufacturer may secure the seat skate assembly to the fitting. The seat assembly including on or more seat skate assemblies may be positioned within a shipping box and transported to the installation location. After the seat assembly is removed from the shipping box, the seat assembly may be maneuvered (for example, rolled) to an internal cabin of the vehicle to a desired position via the seat skate assemblies, at which point the seat skate assemblies are removed from the fittings, and the seat assembly is secured to a seat track through the fittings. Unlike prior methods, however, there is no need to remove protective covers from the fittings after the seat assembly is removed from the shipping box and subsequently secure specialized track segments, mounts, and rollers to the fittings. As such, the seat skate assemblies according to embodiments of the present disclosure streamline an installation process and provide an efficient system and method of transporting a seat assembly and installing the seat assembly within an internal cabin of a vehicle.

As described herein, the seat skate assemblies reduce manufacturing time and cost by replacing disposable supplier-provided protective coverings with seat skate assemblies that need not be removed until the seat assembly is maneuvered to a desired location within an internal cabin. The seat skate assemblies include wheel members that allow the seat assembly to be quickly and easily moved to the desired location. Installation personnel need not spend time removing protective covers from fittings, installing specialized track segments, mounts, and wheels to the fittings, and then later removing such specialized components. Instead, the seat assembly is shipped having the seat skate assemblies, which are used to maneuver the seat assembly to a desired position, at which the seat skate assemblies may then be removed. The seat skate assemblies are less costly than the specialized components typically secured to seat assemblies, thereby reducing manufacturing costs. Further, because installation personnel need not remove protective covers and separately attached specialized components, the time and cost of manufacturing is reduced.

FIG. 1 illustrates a perspective top view of a vehicle, such as an aircraft 10, according to an embodiment of the present disclosure. The aircraft 10 includes a propulsion system 12 that may include two engines 14, for example. Optionally, the propulsion system 12 may include more engines 14 than shown. The engines 14 are carried by wings 16 of the aircraft 10. In other embodiments, the engines 14 may be carried by a fuselage 18 and/or an empennage 20. The empennage 20 may also support horizontal stabilizers 22 and a vertical stabilizer 24.

The fuselage 18 of the aircraft 10 defines an internal cabin, which may be defined by interior sidewall panels that connect to a ceiling and a floor. The internal cabin may include a cockpit, one or more work sections (for example, galleys, personnel carry-on baggage areas, and the like), one or more passenger sections (for example, first class, business class, and economy sections), and an aft section in which an aft rest area assembly may be positioned.

Alternatively, instead of an aircraft, embodiments of the present disclosure may be used with various other vehicles, such as automobiles, buses, locomotives and train cars, seacraft, spacecraft, and the like.

Figure 2A:
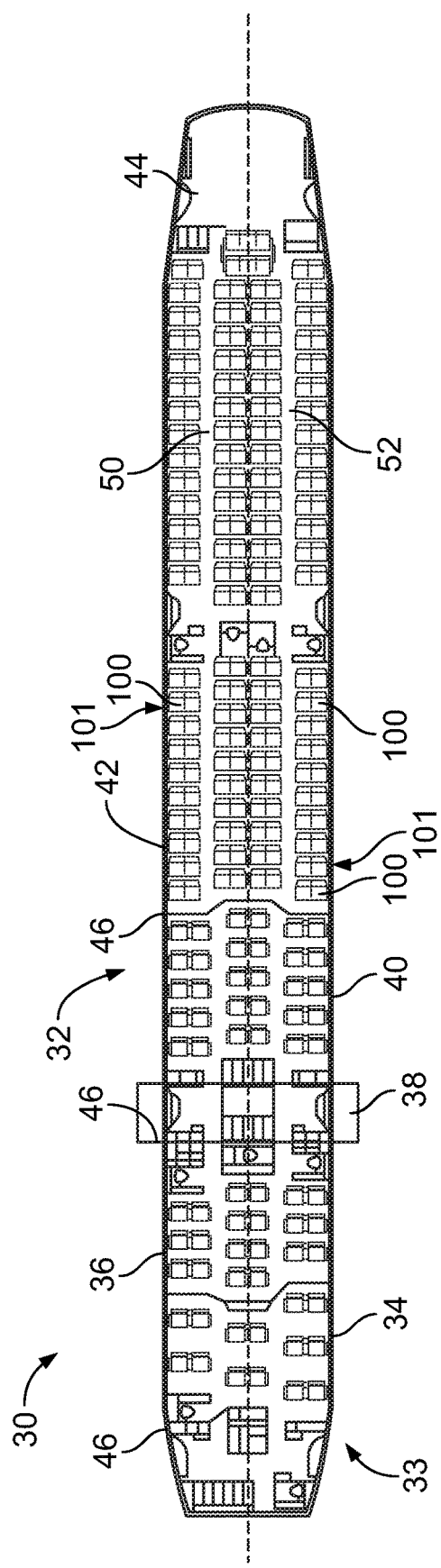
FIG. 2A illustrates a top plan view of an internal cabin of an aircraft, according to an embodiment of the present disclosure.

FIG. 2A illustrates a top plan view of an internal cabin 30 of an aircraft, according to an embodiment of the present disclosure. The internal cabin 30 may be within a fuselage 32 of the aircraft. For example, one or more fuselage walls may define an interior of the internal cabin 30. The interior of the internal cabin 30 is defined by sidewall panels that connect to a ceiling and a floor. The sidewall panels include lateral segments that connect to ceiling segments. The lateral segments define lateral wall portions, while the ceiling segments define at least portions of the ceiling within the internal cabin 30.

The internal cabin 30 includes multiple sections, including a front section 33, a first class section 34, a business class section 36, a front galley station 38, an expanded economy or coach section 40, a standard economy or coach section 42, and an aft section 44, which may include multiple lavatories and galley stations. It is to be understood that the internal cabin 30 may include more or less sections than shown. For example, the internal cabin 30 may not include a first class section, and may include more or less galley stations than shown. Each of the sections may be separated by a cabin transition area 46.

As shown in FIG. 2A, the internal cabin 30 includes two aisles 50 and 52 that lead to the aft section 44. Optionally, the internal cabin 30 may have less or more aisles than shown. For example, the internal cabin 30 may include a single aisle that extends through the center of the internal cabin 30 that leads to the aft section 44.

Seat assemblies 100 are positioned throughout the internal cabin 30. The seat assemblies 100 may be arranged in rows 101. The seat assemblies 100 are installed within the internal cabin 30. A plurality of seat assemblies 100 may be joined together (such as a set of three seat assemblies 100) to form a seat module. As described herein, seat skate assemblies may be secured to fittings of the seat assemblies 100 as the seat assemblies 100 are manufactured. The seat skate assemblies protect the fittings of the seat assemblies 100 and allow the seat assemblies 100 to be efficiently maneuvered to desired positions within the internal cabin 30.

Figure 2B:
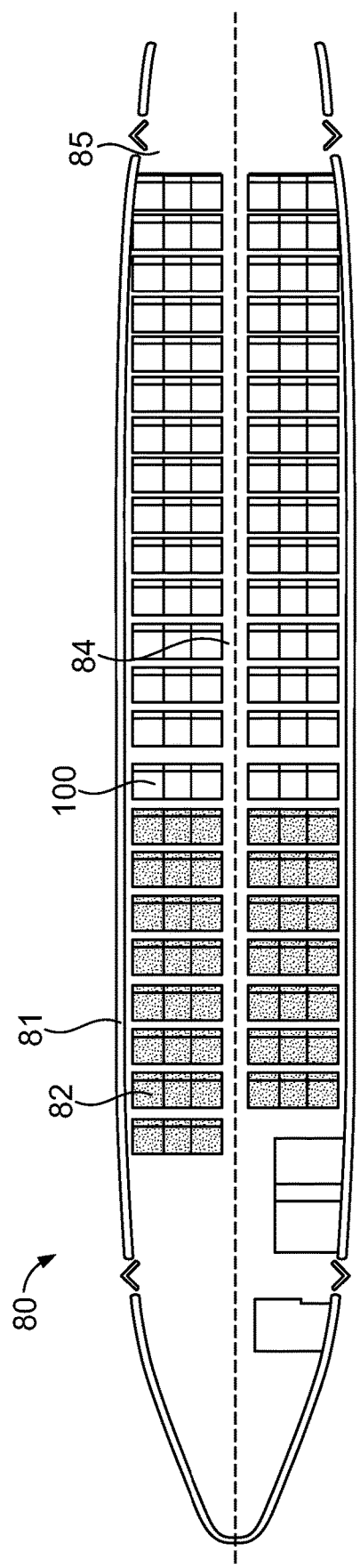
FIG. 2B illustrates a top plan view of an internal cabin of an aircraft, according to an embodiment of the present disclosure.

FIG. 2B illustrates a top plan view of an internal cabin 80 of an aircraft, according to an embodiment of the present disclosure. The internal cabin 80 may be within a fuselage 81 of the aircraft. For example, one or more fuselage walls may define the interior of the internal cabin 80. The internal cabin 80 includes multiple sections, including a main cabin 82 having seat assemblies 100, and an aft section 85 behind the main cabin 82. It is to be understood that the internal cabin 80 may include more or less sections than shown.

The internal cabin 80 may include a single aisle 84 that leads to the aft section 85. The single aisle 84 may extend through the center of the internal cabin 80 that leads to the aft section 85. For example, the single aisle 84 may be coaxially aligned with a central longitudinal plane of the internal cabin 80.

Figure 3:
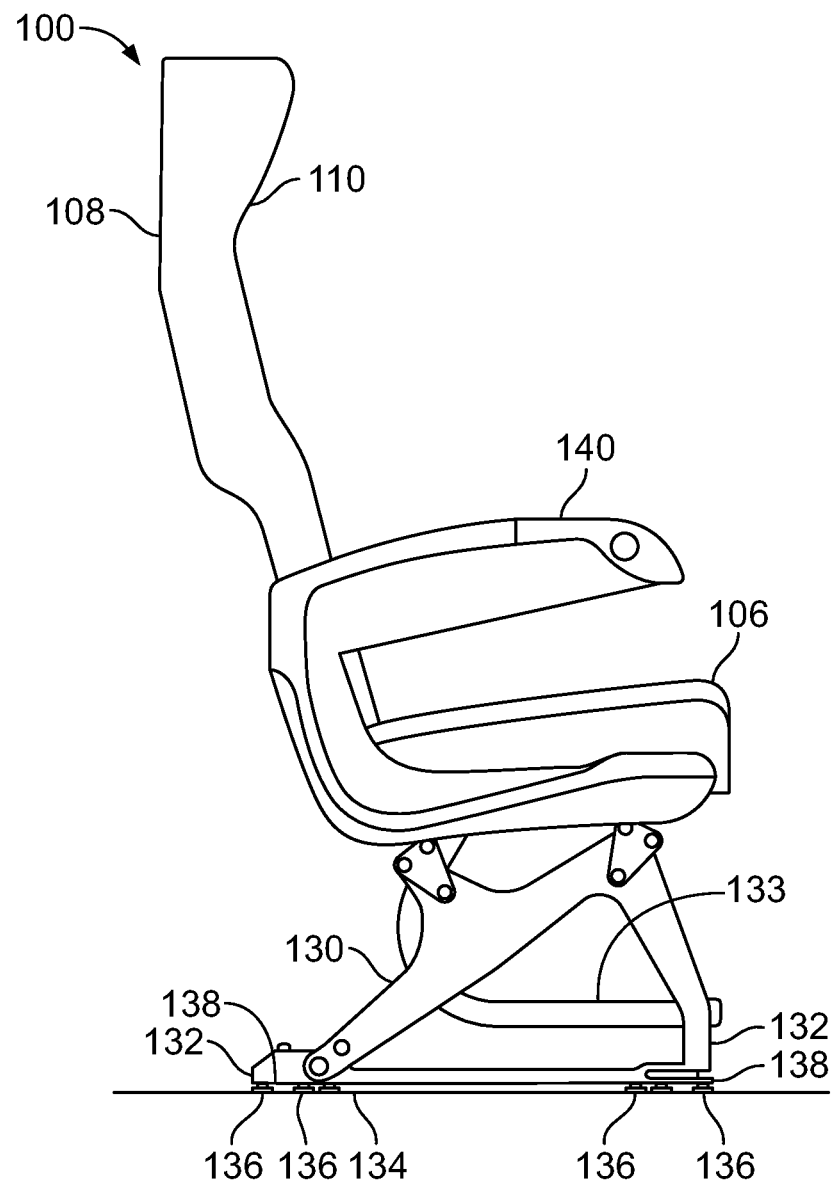
FIG. 3 illustrates a side view of a seat assembly, according to an embodiment of the present disclosure.

FIG. 3 illustrates a side view of a seat assembly 100, according to an embodiment of the present disclosure. The seat assembly 100 is configured to be secured within the internal cabin of a vehicle, such as a commercial aircraft.

The seat assembly 100 includes a base 130, which may include legs 132 that may be secured to seat tracks 134 within an internal cabin of a vehicle. The legs 132 on a same side of the seat assembly 100 may be connected together by a spanner bar 133. In at least one embodiment, securing pins 136 (such as pins) downwardly extend from lower surfaces 138 of the legs 132 (such as lower surfaces of fittings). The securing pins 136 are securely retained within the seat tracks 134. The seat tracks 134 are configured to securely couple to the securing pins 136 to secure the seat assembly 100 in place. The base 130 supports a seat cushion 106 and a backrest 108, which includes a headrest 110. Arm rests 140 may be pivotally secured to the backrest 108.

The seat assembly 100 may be sized and shaped differently than shown in FIG. 3. The seat assembly 100 may include more or less parts than shown in FIG. 3. It is to be understood that the seat assembly 100 shown in FIG. 3 is merely one example of a seat assembly that may be disposed within an internal cabin of a vehicle.

Figure 4:
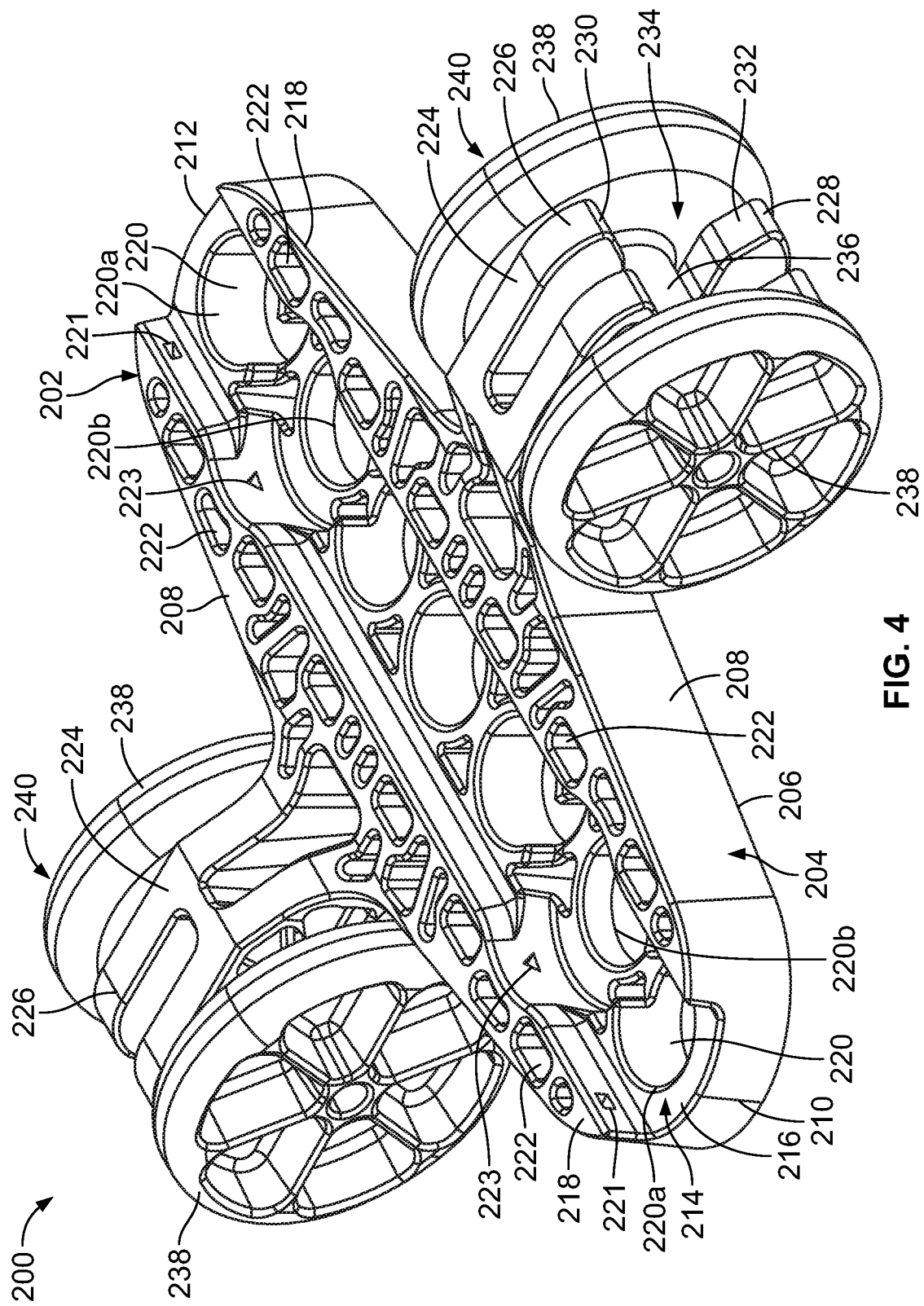
FIG. 4 illustrates a perspective top view of a seat skate assembly, according to an embodiment of the present disclosure.

FIG. 4 illustrates a perspective top view of a seat skate assembly 200, according to an embodiment of the present disclosure. The seat skate assembly 200 is configured to be secured to a fitting (such as a lower surface of a leg) of a seat assembly, such as the seat assembly 100. The seat skate assembly 200 protects the fitting, including pins, during transport of the seat assembly to an installation location, where the seat assembly is installed into a vehicle.

The seat skate assembly 200 includes a main body 202. The main body 202 includes a longitudinal pin-retaining guide 204 having a base 206 integrally connected to lateral walls 208, a first end 210, and an opposite second end 212. A recessed channel 214 extends from and between the first end 210 to the second end 212 on a top surface 216. Lateral ridges 218 extend on either side of the recessed channel 214.

A plurality of pin cavities 220 extend into the base 206. The pin cavities 220 are exposed by the recessed channel 214. The pin cavities 220 are configured to receive and retain pins of fittings of seat assemblies. When pins are retained within the pin cavities 220, the pins are protected from impacts, scratches, and the like by the main body. That is, the pin-retaining guide 204 shrouds and protects the pins from damage. As shown, the pin-retaining guide 204 may include seven pin cavities 220. Optionally, the pin-retaining guide 204 may include more or less than seven pin cavities 220.

A plurality of tie channels 222 may extend through the pin-retaining guide 204 between and through the ridges 218 and the base 206. The tie channels 222 are configured to receive and retain ties, such as zip ties, that may be used to securely tie a fitting of a seat assembly to the seat skate assembly 200. The seat skate assembly 200 may include more or less tie channels 222 than shown. Optionally, the seat skate assembly 200 may not include tie channels 222.

Wheel couplers 224 extend outwardly from the lateral walls 208 of the pin-retaining guide 204. Each wheel coupler 224 includes an upper prong 226 spaced apart from a lower prong 228. The upper prong 226 includes distal tips 230 that cant towards distal tips 232 of the lower prong 228. A space 234 is defined between the distal tips 230 and the distal tips 232.

Wheel axles 236 are rotatably trapped and secured between the upper prongs 226 and the lower prongs 228. Each wheel axle 236 connects to wheels 238 on opposite ends of the wheel couplers 224. A wheel member 240 is defined by two wheels 238 coupled together by a wheel axle 236.

The wheel members 240 may be snapably secured to the wheel couplers 224 by urging the wheel axles 236 towards and into the space 234 between the upper prong 226 and the lower prong 228. As the wheel axle 236 is urged between the upper prong 226 and the lower prong 228, the upper prong 226 and the lower prong 228 may outwardly deflect until the wheel axle 236 is urged inwardly toward the lateral wall 208 past the distal tips 230 and 232, at which point the upper prong 226 and the lower prong 228 deflect back to at-rest positions, and rotatably trap the wheel axle 236 therebetween. The wheel members 240 may be removed from the wheel couplers 224 by pulling the wheel members 240 outwardly from the wheel couplers 224, such that the wheel axles 236 eject from the spaces 234. In this manner, wheel members 240 may be quickly and easily inserted and/or removed from the wheel couplers 224. As such, if a wheel member 240 is damaged, the wheel member 240 may be removed and replaced, in contrast to the entire seat skate assembly 200 being discarded. Alternatively, instead of separated prongs, the wheel couplers 224 may include a contiguous outer ring that defines an inner axle channel that rotatably retains a wheel axle 236.

The wheel members 240 may be larger or smaller than shown. For example, each of the wheel members 240 may have a radius of 1 inch or more. As one non-limiting example, the wheel members 240 may have a radius of 1.5 inches.

In at least one embodiment, the main body 202 and the wheel members 240 are formed of a resilient plastic. Optionally, the main body 202 and/or the wheel members 240 may be formed of metal.

Figure 5:
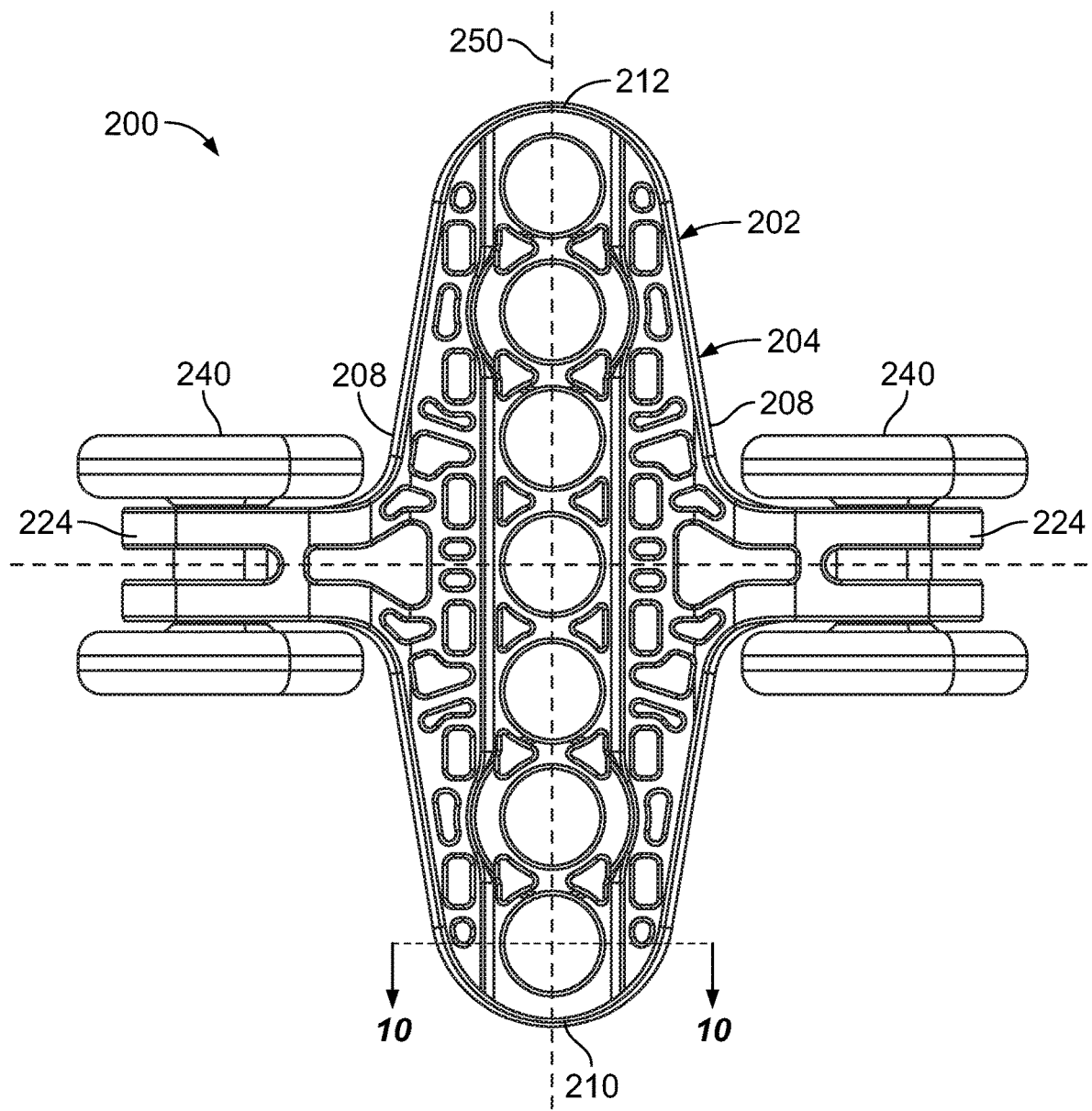
FIG. 5 illustrates a top view of the seat skate assembly.

FIG. 5 illustrates a top view of the seat skate assembly 200. In at least one embodiment, the seat skate assembly 200 is symmetrical about a longitudinal axis 250 that extends through the pin-retaining guide 204. In at least one embodiment, the seat skate assembly 200 is also symmetrical about a lateral axis 252 that is orthogonal to the longitudinal axis 250 and extends from and between the wheel couplers 224. As shown, the wheel couplers 224 may extend outwardly from opposite lateral walls 208 at a middle section of the seat skate assembly 200. Because the seat skate assembly 200 is symmetrical about the longitudinal axis 250, the seat skate assembly 200 may couple to a fitting in a forward direction of a rearward direction. That is, an individual need not determine a proper forward direction of the seat skate assembly 200 before securing the seat skate assembly 200 to a fitting of a seat assembly.

Additionally, the top and bottom surfaces of the seat skate assembly 200 may be mirror images of one another. In this manner, the seat skate assembly 200 may be secured to a fitting in an upright or flipped position, as both orientations may be the same. As such, an individual need not determine a proper upright position of the seat skate assembly 200 before securing the seat skate assembly to a fitting of a seat assembly.

Figure 6:
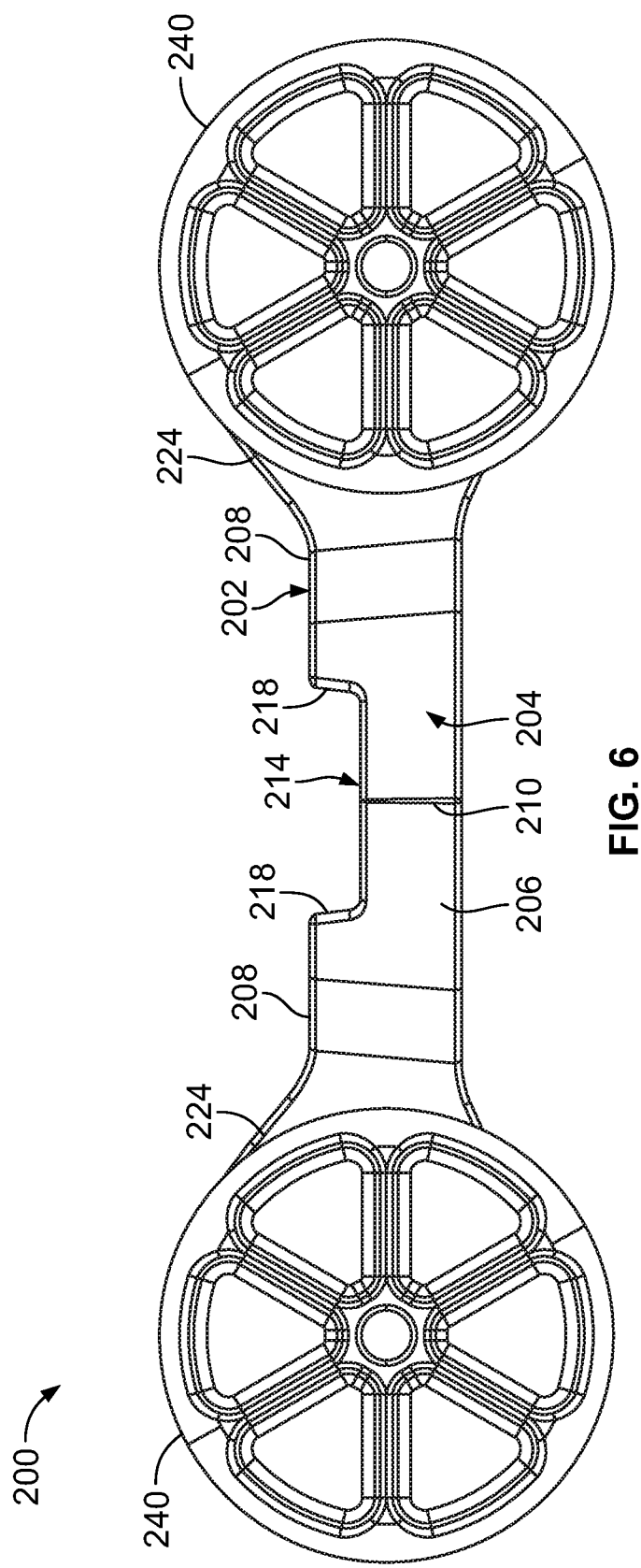
FIG. 6 illustrates an end view of the seat skate assembly.

FIG. 6 illustrates an end view of the seat skate assembly 200. As shown, the base 206 is integrally connected to lateral walls 208, the first end 210, and the opposite second end 212 (shown in FIG. 4). The recessed channel 214 extends from and between the first end 210 to the second end 212. The lateral ridges 218 extend on either side of the recessed channel 214. The lateral ridges 218 are spaced apart a distance that coincides with a width of a lower portion of a seat assembly, such as a fitting, lower bar, or the like. In this manner, the lower portion of the seat assembly may be securely retained within the recessed channel 214 between the lateral ridges 218.

Figure 7:
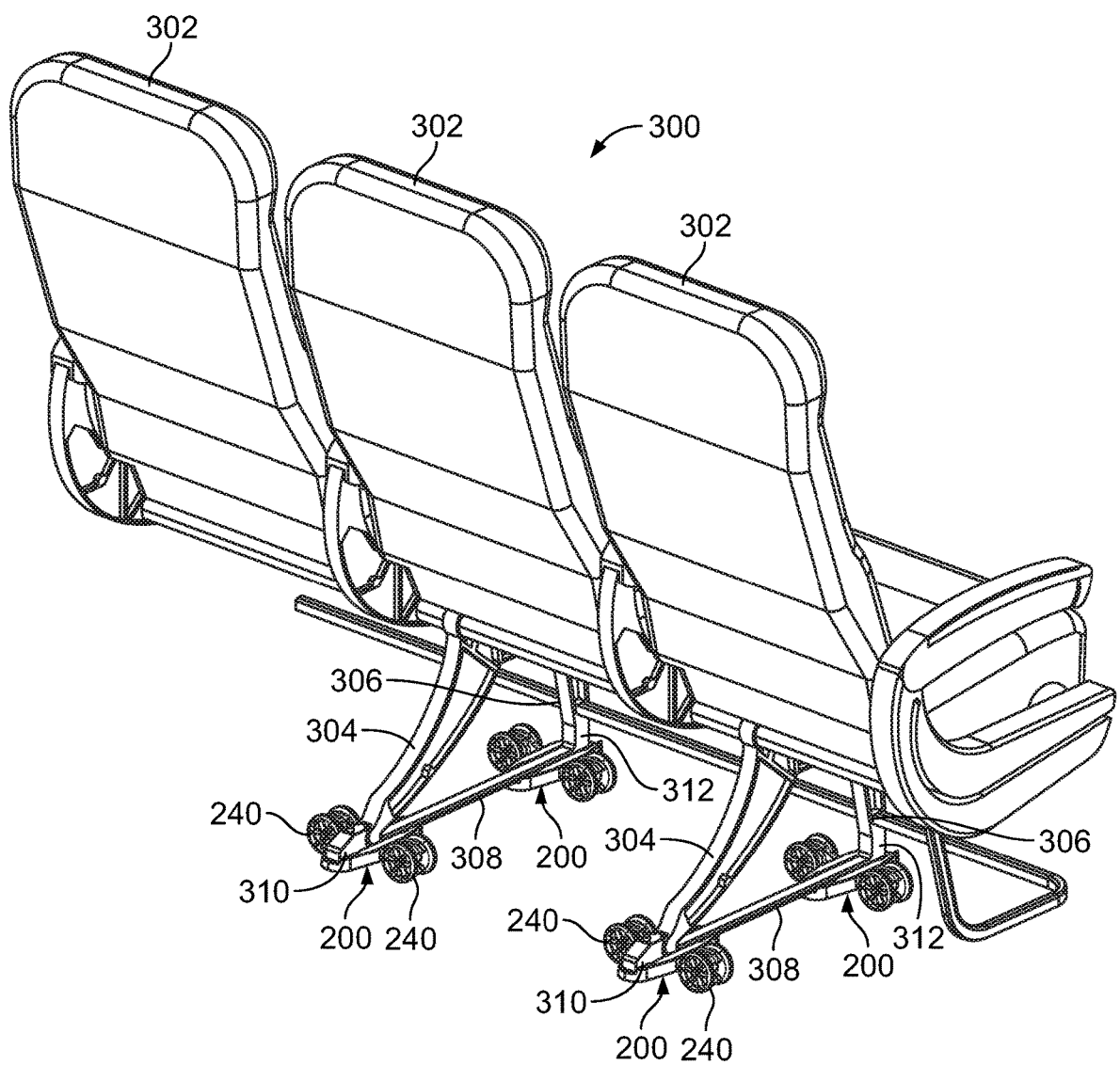
FIG. 7 illustrates a perspective rear view of a seat module having a plurality of seat assemblies, according to an embodiment of the present disclosure.

FIG. 7 illustrates a perspective rear view of a seat module 300 having a plurality of seat assemblies 302, according to an embodiment of the present disclosure. In at least one embodiment, the seat assemblies 302 are examples of the seat assembly 100 shown and described with respect to FIG. 3. As shown, the seat assemblies 302 may be supported by two aft legs 304 and two fore legs 306. Lower bars 308 may connect an aft leg 304 to a fore leg 306. The aft legs 304 are coupled to (for example, are integrally formed with) fittings 310, and the fore legs 306 are coupled to (for example, are integrally formed with) fittings 312. The fittings 310 and 312 are configured to secure the seat module 300 to seat tracks within an internal cabin of a vehicle. As shown in FIG. 7, the seat assembly includes a first aft leg 304, a first fitting 310 coupled to the first aft leg 304, a second aft leg 304, a second fitting 310 coupled to the second aft leg 304, a first fore leg 306, a third fitting 312 coupled to the first fore leg 306, a second fore leg 306, a fourth fitting 312 coupled to the second fore leg 306, and seat skate assemblies secured to the first fitting 310, the second fitting 310, the third fitting 312, and the fourth fitting 312. Further, a first lower bar 308 connects the first aft leg 304 to the first fore leg 306, and a second lower bar 308 connects the second aft leg 304 to the second fore leg 306. The first lower bar 308 may be integrally formed with the legs and/or the fittings. Optionally, the seat module 300 may not include the lower bars 308.

As the seat module 300 is manufactured, and before the seat module 300 is delivered to an installation location of a vehicle, seat skate assemblies 200 are securely coupled to the fittings 310 and 312. The seat module 300 having the seat skate assemblies 200 may then be positioned in a shipping box. The seat skate assemblies 200 protect pins of the fittings 310 and 312 as the seat module 300 during transit. Further, when the seat module 300 arrives at the installation location, the seat module 300 is removed from the shipping box, and the seat module 300 may be quickly and easily maneuvered to a position within an internal cabin via the wheel members 240 of the seat skate assemblies 200. That is, there is no need to remove protective covers and subsequently install specialized track segments, mounts, and wheels to the fittings 310 and 312.

As shown in FIG. 7, the seat skate assemblies 200 are secured directly to portions of the seat assemblies 302. In particular, the seat skate assemblies 200 are secured directly to the fittings 310 and 312. The seat skate assemblies 200 are not secured to a separate and distinct track segment that separately secures to the seat assemblies 302.

Figure 8:
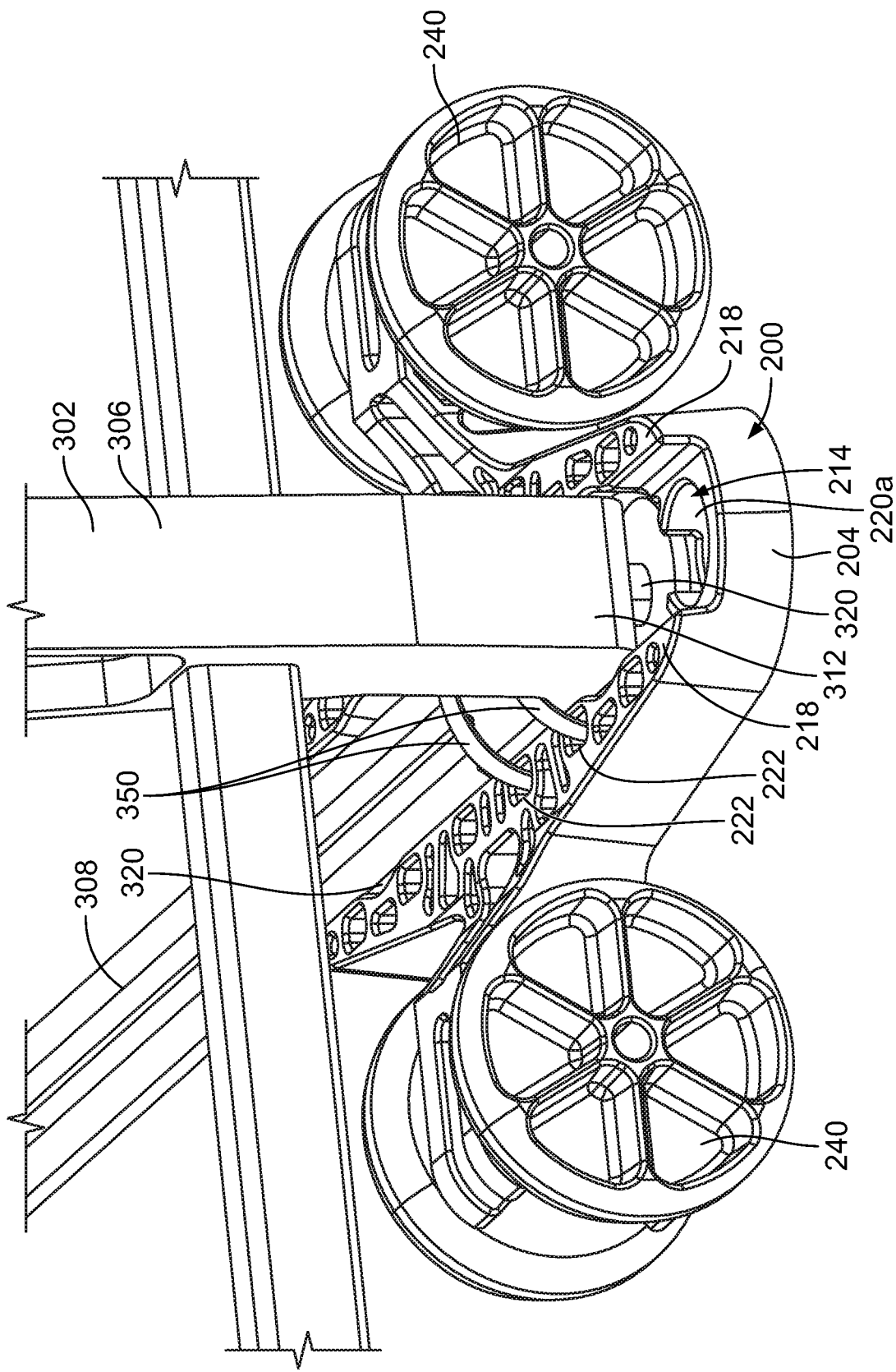
FIG. 8 illustrates a perspective front view of a seat skate assembly secured to a fitting of a fore leg of a seat assembly, according to an embodiment of the present disclosure.

FIG. 8 illustrates a perspective front view of the seat skate assembly 200 secured to a fitting 312 of a fore leg 306 of a seat assembly 302, according to an embodiment of the present disclosure. The seat assembly 302 may be part of the seat module 300. Optionally, the seat assembly 302 may be a separate seat assembly that is not part of a seat module.

The fitting 312 includes pins 320 that are retained within corresponding pin cavities 220 (shown in FIG. 4) of the pin-retaining guide 204. By retaining multiple pins 320, the pin-retaining guide 204 prevents, minimizes, or otherwise reduces the potential of the fitting 312 pivoting or rotating relative to the seat skate assembly 200, or vice versa. Further, the lower portions of the seat fitting 312 and/or the lower bar 308 are retained within the recessed channel 214 and axially constrained by the lateral ridges 218, thereby further preventing, minimizing, or otherwise reducing the potential of the fitting 312 pivoting or rotating relative to the seat skate assembly 200, or vice versa. Additionally, flexible ties 350 may be fed through the tie channels 222 and tied around the fitting 312 and/or the lower bar 308 to further secure the seat assembly 302 to the seat skate assembly 200. The flexible ties 350 may be reusable. In at least one other embodiment, the flexible ties 350 are not used.

Figure 9:
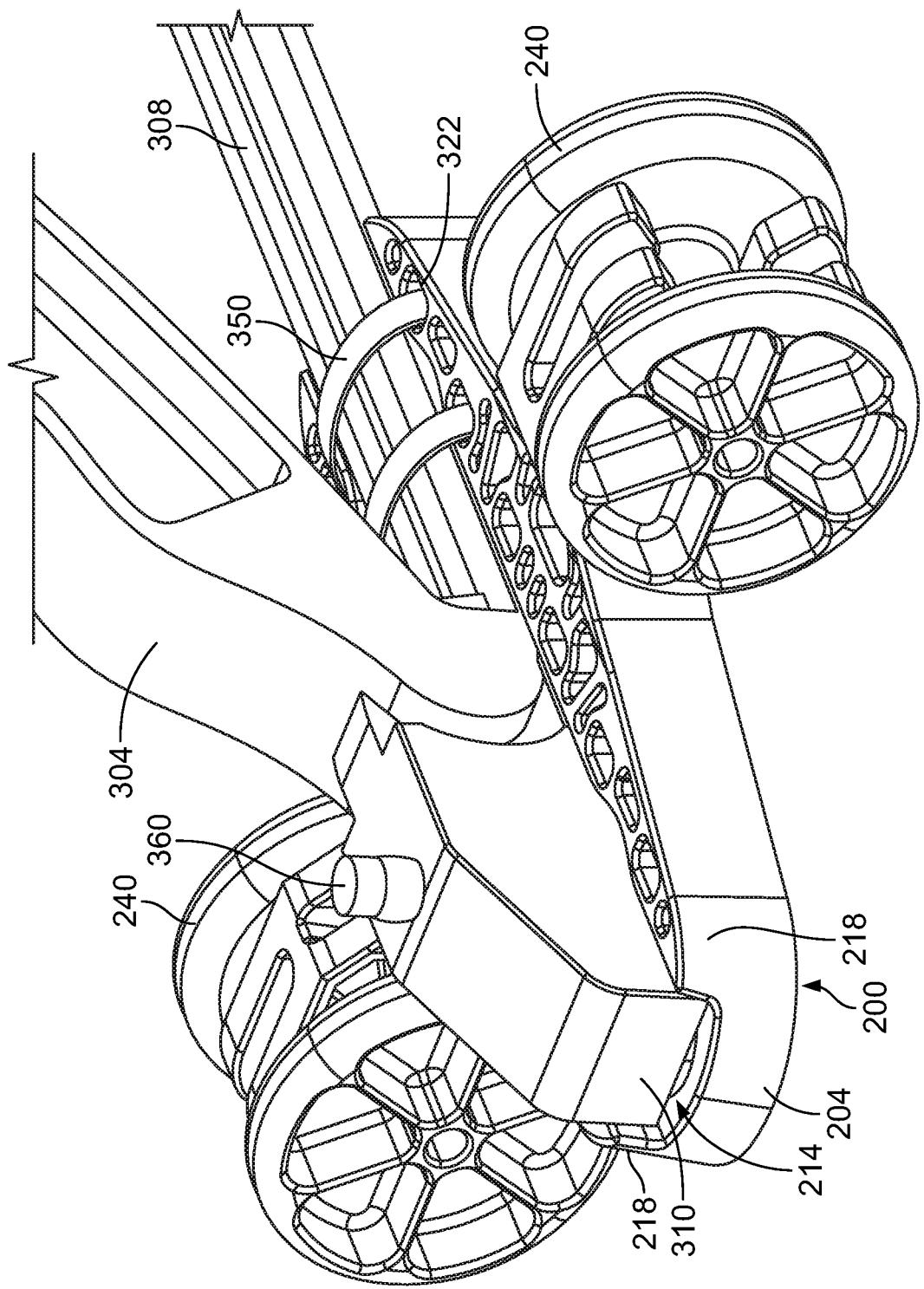
FIG. 9 illustrates a perspective rear view of a seat skate assembly secured to a fitting of an aft leg of a seat assembly, according to an embodiment of the present disclosure.

FIG. 9 illustrates a perspective rear view of the seat skate assembly 200 secured to a fitting 310 of an aft leg 304 of a seat assembly 302, according to an embodiment of the present disclosure. The seat assembly 302 may be part of the seat module 300. Optionally, the seat assembly 302 may be a separate seat assembly that is not part of a seat module.

The fitting 310 includes pins 360 that are retained within corresponding pin cavities 220 (shown in FIG. 4) of the pin-retaining guide 204. By retaining multiple pins 322, the pin-retaining guide 204 prevents, minimizes, or otherwise reduces the potential of the fitting 310 pivoting or rotating relative to the seat skate assembly 200, or vice versa. Further, the lower portions of the fitting 310 and/or the lower bar 308 are retained within the recessed channel 214 and axially constrained by the lateral ridges 218, thereby further preventing, minimizing, or otherwise reducing the potential of the fitting 310 pivoting or rotating relative to the seat skate assembly 200, or vice versa. Additionally, flexible ties 350 may be fed through the tie channels 222 and tied around the fitting 310 and/or the lower bar 308 to further secure the seat assembly 302 to the seat skate assembly 200.

Referring to FIGS. 4, 8, and 9, outermost pin cavities 220*a* may be used to locate the fittings 310 of the aft legs 304 within the pin-retaining guide 204. For example, an aft locating indication 221 (such as text, a graphic, a symbol, an embossment, an indentation, and/or the like) may indicate that an aft most pin of the fitting 310 is to be positioned within the outermost pin cavity 220*a*. Similarly, an inner pin cavity 220*b* may be used to locate the fittings 312 of the fore legs 306 within the pin-retaining guide 204. For example, a fore locating indication 223 (such as text, a graphic, a symbol, an embossment, an indentation, and/or the like) may indicate that a fore most pin of the fitting 312 is to be positioned within the inner pin cavity 220*b*. As such, the pin-retaining guide may include or more locating indications that indicate one or more pin positions for fittings. Optionally, the pin-retaining guide 204 may not include the aft locating indication 221 or the fore locating indication 223.

Figure 10A:
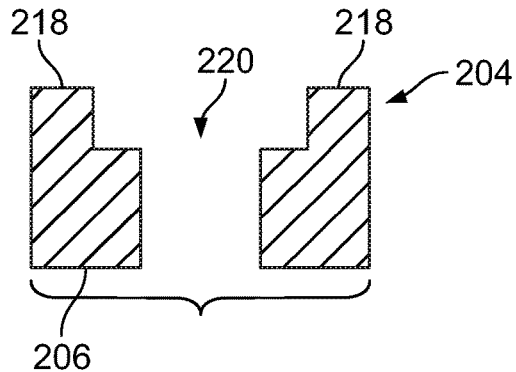
FIG. 10A illustrates a cross-sectional view of a pin-retaining guide through line 10-10 of FIG. 5, according to an embodiment of the present disclosure.

FIG. 10A illustrates a cross-sectional view of the pin-retaining guide 204 through line 10-10 of FIG. 5, according to an embodiment of the present disclosure. As shown, the pin cavity 220 may extend entirely through the pin-retaining guide 204. Each of the pin cavities 220 may be configured as shown in FIG. 10A.

Figure 10B:
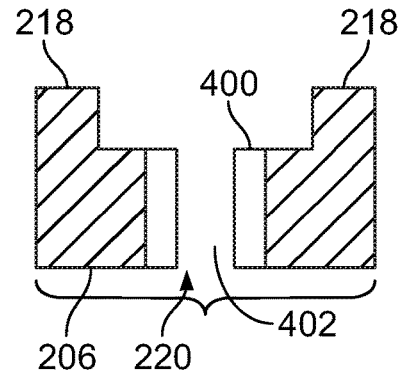
FIG. 10B illustrates a cross-sectional view of a pin-retaining guide through line 10-10 of FIG. 5, according to an embodiment of the present disclosure.

FIG. 10B illustrates a cross-sectional view of the pin-retaining guide 204 through line 10-10 of FIG. 5, according to an embodiment of the present disclosure. In this embodiment, a bushing 400 may be inserted into the pin cavity 220. In at least one embodiment, the bushing 400 is an insert that is configured to be snapably retained within the pin cavity 220, such as through one or more resilient snap legs. The bushing 400 has an internal pin cavity 402 that has a smaller diameter than that of the pin cavity 220. In this manner, bushings 400 may be inserted into the pin cavities 220 so that the pin-retaining guide 204 may securely retain pins of different diameters. The bushings 400 may be used with pin cavities 220 of any of the embodiments of the present disclosure.

Figure 10C:
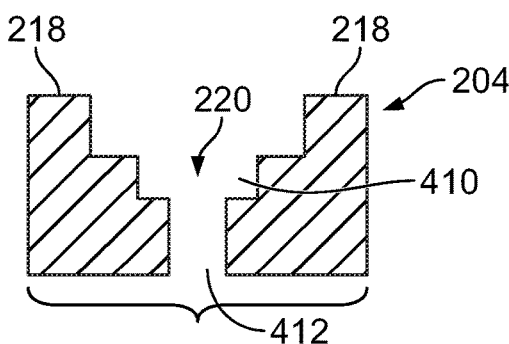
FIG. 10C illustrates a cross-sectional view of a pin-retaining guide through line 10-10 of FIG. 5, according to an embodiment of the present disclosure.

FIG. 10C illustrates a cross-sectional view of the pin-retaining guide 204 through line 10-10 of FIG. 5, according to an embodiment of the present disclosure. In this embodiment, the pin cavity 220 includes a first diameter 410 and a second diameter 412 that differs from the first diameter 410. As such, the pin cavity 220 may be configured to securely retain pins of different sizes. One or more pin cavities 220 shown in FIG. 5 may be configured as shown in FIG. 10C.

Figure 10D:
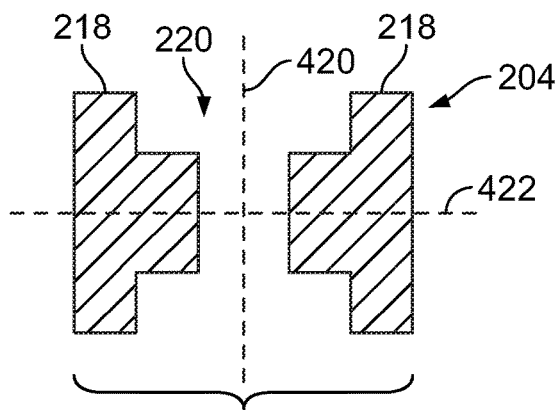
FIG. 10D illustrates a cross-sectional view of a pin-retaining guide through line 10-10 of FIG. 5, according to an embodiment of the present disclosure.

FIG. 10D illustrates a cross-sectional view of the pin-retaining guide 204 through line 10-10 of FIG. 5, according to an embodiment of the present disclosure. In this embodiment, the pin-retaining guide 204 is symmetrical about a vertical axis 420 and a horizontal axis 422. The symmetry about the vertical axis 420 and the horizontal axis 422 allows the pin-retaining guide 204 to operate the same even if flipped over.

Figure 10E:
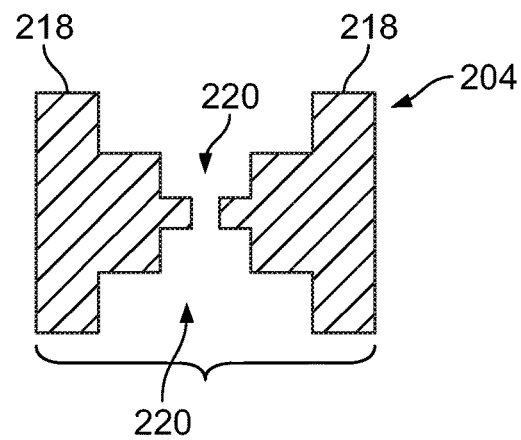
FIG. 10E illustrates a cross-sectional view of a pin-retaining guide through line 10-10 of FIG. 5, according to an embodiment of the present disclosure.

FIG. 10E illustrates a cross-sectional view of the pin-retaining guide 204 through line 10-10 of FIG. 5, according to an embodiment of the present disclosure. The embodiment shown in FIG. 10E is similar to that shown in FIG. 10D, except that the pin cavity 220 may have different diameters, as described with respect to FIG. 10C.

Figure 11:
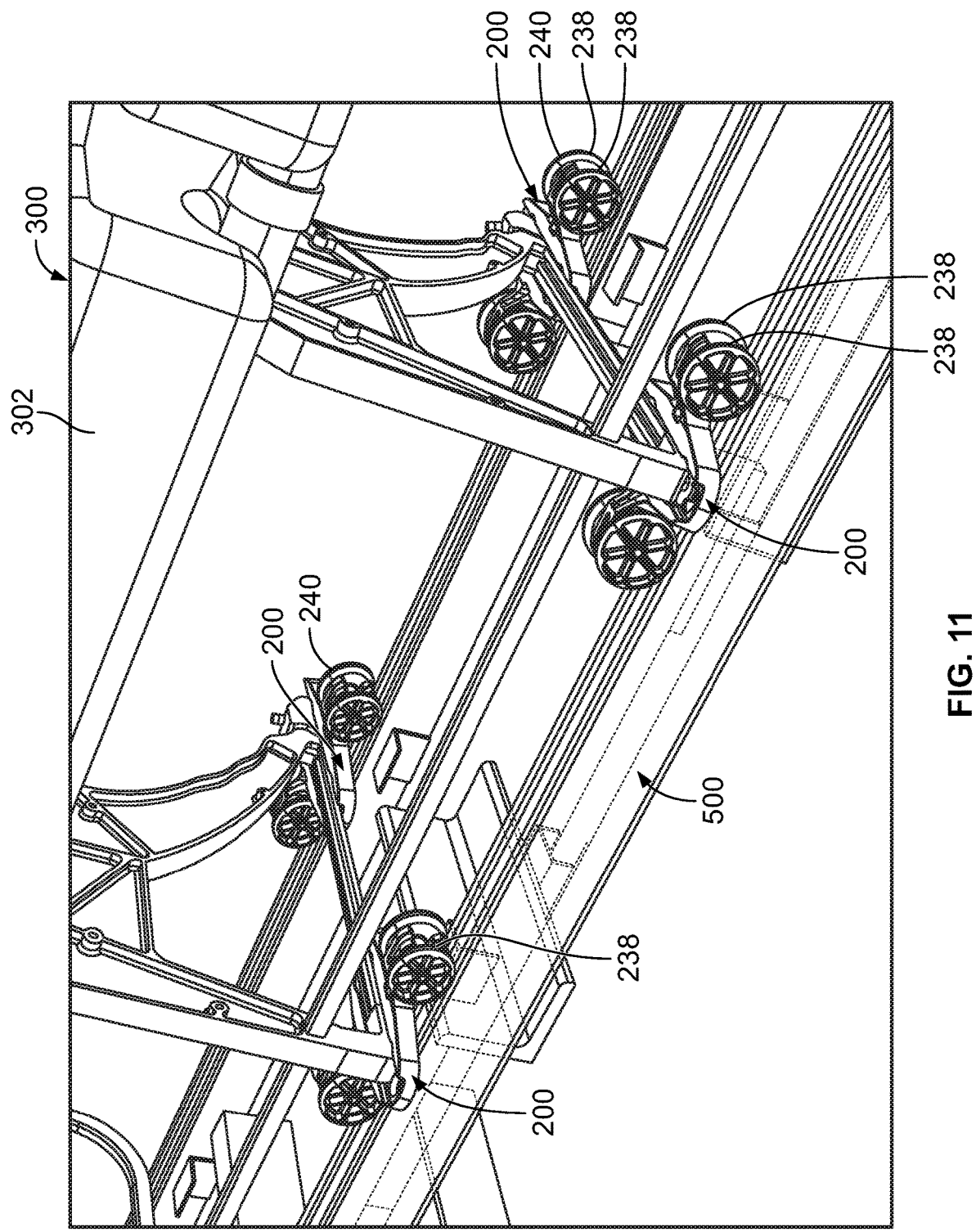
FIG. 11 illustrates a perspective front view of the seat module positioned on a seat lift, according to an embodiment of the present disclosure.

FIG. 11 illustrates a perspective front view of the seat module 300 positioned on a seat lift 500, according to an embodiment of the present disclosure. The seat lift 500 may be a plank-like structure that is used to load the seat module 300 into an internal cabin of a vehicle. The wheels 238 of the wheel members 240 fit within tracks or channels of the seat lift 500 to ensure that the seat module 300 rolls into the internal cabin in a controlled manner.

Optionally, the seat module 300 need not be mounted on the seat lift 500. Instead, the seat module 300 may be moved into the internal cabin via an elevating system, or simply lifted and rolled into the internal cabin, such as via tools, machinery, and/or via manual force. Further, seat assemblies 302 may be individually maneuvered into the internal cabin, whether or not they are coupled together to form a seat module.

Figure 12:
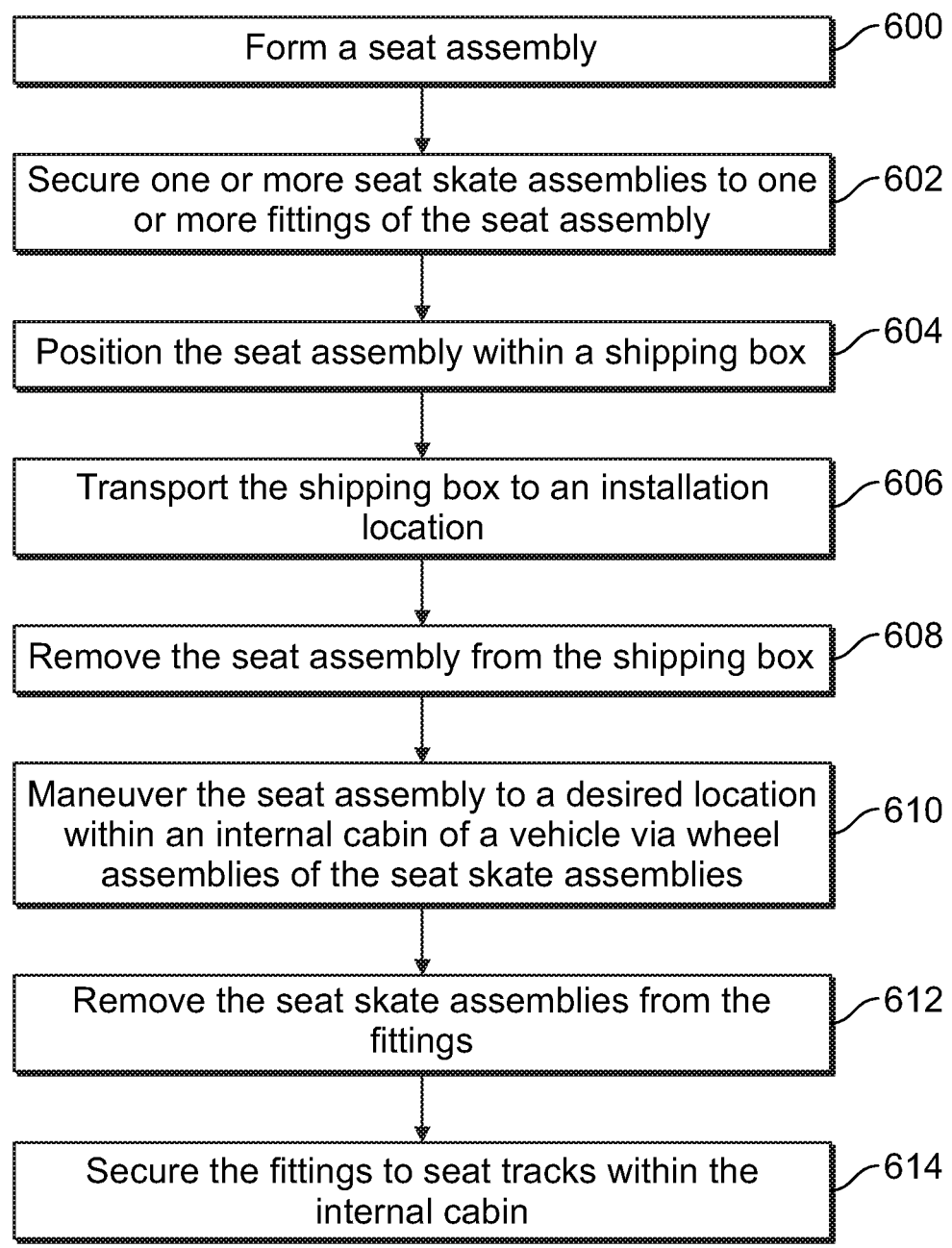
FIG. 12 illustrates a flow chart of a seat transit method, according to an embodiment of the present disclosure.

FIG. 12 illustrates a flow chart of a seat transit method, according to an embodiment of the present disclosure. The method begins at 600, at which a seat assembly is formed. At 602, one or more seat skate assemblies are secured to one or more fittings of the seat assembly. At 604, the seat assembly is then positioned within a shipping box or other such container. At 606, the shipping box having the seat assembly with the seat skate assemblies is transported to an installation location. At 608, the seat assembly is removed from the shipping box. At 610, the seat assembly is then maneuvered to a desired location within an internal cabin of a vehicle via wheel assemblies of the seat skate assemblies. At 612, at the desired location, the seat skate assemblies are removed from the fittings. At 614, the fittings are then secured to seat tracks within the internal cabin.

In at least one embodiment, loops may be fastened to a box pallet, such as via screws or bolts. Reusable zip ties may secure the seat skates to the loops secured to the shipping box. As such, the seat skates may be securely tied down during shipping.

As described herein, embodiments of the present disclosure provide efficient systems and methods for transporting a seat assembly to an internal cabin of a vehicle that is being manufactured. Further, embodiments of the present disclosure provide efficient systems and methods for protecting fittings of seat assemblies during transport. Moreover, embodiments of the present disclosure provide systems and methods for simplifying an installation process for seat assemblies in relation to an internal cabin of a vehicle.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A seat skate assembly configured to be secured to a fitting of a seat assembly, the seat skate assembly comprising:
    a pin-retaining guide including a base integrally connected to lateral walls, a first end, and an opposite second end, wherein a recessed channel extends from and between the first end to the second end, wherein lateral ridges extend on each side of the recessed channel, wherein a plurality of pin cavities extend into the base and are exposed by the recessed channel, and wherein the plurality of pin cavities are configured to receive and retain one or more pins of the fitting;
    one or more wheel couplers; and
    one or more wheel members rotatably coupled to the one or more wheel couplers, wherein the one or more wheel members allow the seat assembly to be moved;
    wherein the one or more wheel couplers comprises:
        an upper prong fixedly connected to at least one of the lateral walls above a wheel axle of the one or more wheel members; and
        a lower prong fixedly connected to the at least one lateral walls below the wheel axle of the one or more wheel members, wherein the lower prong is spaced apart from the upper prong, and wherein the wheel axle is secured between the upper prong and the lower prong to define an axis of rotation of the one or more wheel members parallel to a length of the channel.

2. The seat skate assembly of claim 1, wherein the pin-retaining guide further comprises a plurality of tie channels configured to receive and retain ties that securely tie the fitting to the seat skate assembly.

3. The seat skate assembly of claim 1, wherein the one or more wheel members comprises two wheels connected by the wheel axle.

4. The seat skate assembly of claim 1, wherein the seat skate assembly is symmetrical about a longitudinal axis.

5. The seat skate assembly of claim 4, wherein the seat skate assembly is symmetrical about a lateral axis.

6. The seat skate assembly of claim 1, wherein the pin-retaining guide comprises one or more locating indications that indicate one or more pin positions for the fitting.

7. The seat skate assembly of claim 1, further comprising one or more bushings having internal pin cavities having a smaller diameter than the plurality of pin cavities, wherein the one or more bushings are configured to be inserted into one or more of the plurality of pin cavities.

8. The seat skate assembly of claim 1, wherein at least one of the plurality of pin cavities has a first diameter and a second diameter that differs from the first diameter.

9. The seat skate assembly of claim 1, wherein the pin-retaining guide is symmetrical about a vertical axis and a horizontal axis.

10. The seat skate assembly of claim 1, wherein the fitting of the seat assembly is configured to be secured to a seat track within an internal cabin of a vehicle by the one or more pins.

11. The seat skate assembly of claim 1, wherein the plurality of cavities are linearly aligned within the recessed channel.

12. A seat assembly comprising:
    a first aft leg;
    a first fitting coupled to the first aft leg;
    a second aft leg;
    a second fitting coupled to the second aft leg;
    a first fore leg;
    a third fitting coupled to the first fore leg;
    a second fore leg;
    a fourth fitting coupled to the second fore leg; and
    a plurality of seat skate assemblies, wherein each of the plurality of seat skate assemblies is secured to a respective one of the first fitting, the second fitting, the third fitting, or the fourth fitting, wherein each of the plurality of seat skate assemblies comprises:
        a pin-retaining guide including a base integrally connected to lateral walls, a first end, and an opposite second end, wherein a recessed channel extends from and between the first end to the second end, wherein lateral ridges extend on each side of the recessed channel, wherein a plurality of pin cavities extend into the base and are exposed by the recessed channel, and wherein the plurality of pin cavities are configured to receive and retain one or more pins of one of the first fitting, the second fitting, the third fitting, or the fourth fitting;
one or more wheel couplers;
one or more wheel members rotatably coupled to the one or more wheel couplers, wherein the one or more wheel members allow the seat assembly to be moved;
wherein the one or more wheel couplers comprises:
an upper prong fixedly connected to at least one of the lateral walls above a wheel axle of the one or more wheel members; and
a lower prong fixedly connected to the at least one lateral wall below the wheel axle of the one or more wheel members, wherein the lower prong is spaced apart from the upper prong, and wherein the wheel axle is secured between the upper prong and the lower prong to define an axis of rotation of the one or more wheel members parallel to a length of the channel.

13. The seat assembly of claim 12, further comprising:
a first lower bar that connects the first aft leg to the first fore leg; and
a second lower bar that connects the second aft leg to the second fore leg.

14. The seat assembly of claim 12, wherein the plurality of seat skate assemblies are directly secured to the seat assembly before the seat assembly is positioned within a shipping box.

15. The seat assembly of claim 12, wherein the pin-retaining guide further comprises a plurality of tie channels configured to receive and retain ties that securely tie the fitting to the seat skate assembly.

16. The seat assembly of claim 12, wherein the seat skate assembly is symmetrical about a longitudinal axis, a lateral axis, a vertical axis, and a horizontal axis.

17. The seat skate assembly of claim 12, wherein each of the first fitting, the second fitting, the third fitting, and the fourth fitting is configured to be secured to a seat track within an internal cabin of a vehicle by one or more pins.

18. The seat skate assembly of claim 12, wherein the plurality of pin cavities are linearly aligned within the recessed channel.

19. A method of transporting a seat assembly, the method comprising:
securing a seat skate assembly to a fitting of the seat assembly wherein the seat skate assembly comprises a main body having first end and second end interconnected by lateral walls, and an elongated channel located between the lateral walls and extending from the first end to the second end, wherein the fitting of the seat assembly is securable to a seat track within an internal cabin of a vehicle, wherein said securing comprises retaining a plurality of pins of the fittings within pin cavities located within the elongated channel in the seat skate assembly; and
moving the seat assembly with one or more wheel members rotatably coupled to one or more wheel couplers of the seat skate assembly;
wherein the one or more wheel couplers comprises:
an upper prong fixedly connected to at least one of the lateral walls above a wheel axle of the one or more wheel members; and
a lower prong fixedly connected to the at least one lateral wall below the wheel axle of the one or more wheel members, wherein the lower prong is spaced apart from the upper prong, and wherein the wheel axle is secured between the upper prong and the lower prong to define an axis of rotation of the one or more wheel members parallel to a length of the channel.

20. The method of claim 19, further comprising positioning the seat assembly within in a shipping box, wherein said securing occurs before said positioning.

* * * * *